United States Patent [19]

Gutz et al.

[11] Patent Number: 5,233,512
[45] Date of Patent: Aug. 3, 1993

[54] METHOD AND APPARATUS FOR ACTUATOR FAULT DETECTION

[75] Inventors: David A. Gutz, Danvers; Michael S. Idelchik, Swampscott, both of Mass.

[73] Assignee: General Electric Company, Cincinnati, Ohio

[21] Appl. No.: 541,860

[22] Filed: Jun. 21, 1990

[51] Int. Cl.$^5$ .............................................. G05B 17/00
[52] U.S. Cl. ..................... 364/150; 364/184; 318/563
[58] Field of Search ............... 364/148, 149, 150, 151, 364/152, 153, 184–187; 318/561, 563, 565, 624

[56] References Cited

U.S. PATENT DOCUMENTS

| | | | |
|---|---|---|---|
| 3,221,229 | 11/1965 | Kezer et al. | 318/18 |
| 4,092,716 | 5/1978 | Berg et al. | 364/424 |
| 4,258,545 | 3/1981 | Slater | 60/226 R |
| 4,294,162 | 10/1981 | Fowler et al. | 91/434 |
| 4,338,659 | 7/1982 | Kurakake | 364/150 |
| 4,355,358 | 10/1982 | Clelford et al. | 364/424 |
| 4,368,510 | 1/1983 | Anderson | 364/151 |
| 4,509,110 | 4/1985 | Levasque, Jr. et al. | 364/153 |
| 4,546,426 | 10/1985 | Hafner et al. | 364/153 |
| 4,641,517 | 2/1987 | Spock et al. | 73/116 |
| 4,663,703 | 5/1987 | Axelby et al. | 364/150 |
| 4,679,136 | 7/1978 | Shigemasa | 364/150 |
| 4,719,561 | 1/1988 | Shigemasa | 364/151 |

Primary Examiner—Jerry Smith
Assistant Examiner—Thomas E. Brown
Attorney, Agent, or Firm—Jerome C. Squillaro; Bernard E. Shay

[57] ABSTRACT

A method for fault detection in a closed loop feedback control system for an actuator includes modeling the actuator for providing a model output simulating the actuator output in response to a model input which is also the actuator input, and comparing the actuator output and the model output for providing a fault indication upon exceeding a threshold. An apparatus includes a feedback control system having means for providing a feedback signal indicative of an output of the actuator, means for comparing an output demand with the feedback signal for providing an actuator output error, and means for providing to the actuator an input proportional to the error. The apparatus also includes a fault detection system having means for modeling the actuator for providing a model output simulating the actuator output in response to a model input, means for providing the actuator input also to the actuator modeling means as the model input, and means for comparing the actuator output and the model output and providing a fault indication upon exceeding a threshold.

11 Claims, 3 Drawing Sheets

METHOD AND APPARATUS FOR ACTUATOR FAULT DETECTION

TECHNICAL FIELD

The present invention relates generally to closed loop feedback control systems for actuators, and, more specifically, to a method and apparatus for detecting faults in the actuator feedback control system.

BACKGROUND ART

Gas turbine engines include many types of actuators for positioning control members for controlling operation of the engines. The actuators may be linear or rotary servomechanisms having output members whose position is to be controlled. The actuators may be hydraulic, pneumatic, or electrical, and are used for various purposes. For example, a gas turbine engine includes actuators for controlling propeller pitch, positions of variable geometry stator vanes in the high-pressure and low-pressure turbines, and for controlling the position of fuel metering valves and afterburner variable area nozzles.

Closed loop feedback control systems for the actuators are well known in the art and provide automatic control for maintaining a desired or demand position of the actuators. The feedback control systems may be implemented in conventional forms such as an analog embodiment, a dedicated digital embodiment, and computer embodiments utilizing software, or algorithms.

For improving reliability and operation of a gas turbine engine used for powering an aircraft, fault detection systems are typically utilized in the engine control system for detecting faults and for allowing remedial action to be taken. It is conventional to use mathematical models of the entire control system, i.e., the particular closed loop feedback control system for a particular actuator, to predict the output of the actuator and compare that output of the actuator with the prediction to determine if any deviation therebetween is indicative of a fault occuring in the control system and actuator.

A mathematical model usually cannot exactly duplicate the characteristics of a control system and actuator, particularly during transient as opposed to steady state operation. A closed loop control system has a dynamics performance including both steady state and transient response. The dynamic performance of the system includes conventional factors such as stability, accuracy and response time. In order to have acceptable performance in a fault detection system having a mathematical model representative of the actuator control system the fault detection system dynamics must be closely matched to the actuator control system dynamics both during steady state and transient operation.

Accordingly, relatively complex mathematical models are typically utilized for modeling the control system for improving the matching between the systems dynamics. Relatively simple models of the actuator control system will result in relatively large deviation between the actuator output and the predicted model output at least during transient operation of the system. Such relatively large deviation can lead to erroneous fault indications which may be reduced by increasing the threshold above which a fault indication is made. However, increasing the threshold reduces the sensitivity of failure detection by eliminating fault indications for failures below the threshold, as well as decreases the response time for indicating a failure.

The response time of the fault detection system is primarily determined by the transient dynamic operation of the fault detection system. In some applications in a gas turbine engine, very high response times are required in order to detect a fault in the system to allow for prompt remedial action. For example, a gas turbine engine includes a fuel metering control system having an actuator which positions a fuel valve for metering the amount of fuel to the engine, and thereby controlling the operation thereof. In an engine operating at 95% rated rotor speed, for example, a fuel metering valve actuator failure such as for example a fail-positive would allow for increased fuel flow to the engine and possibly lead to compressor stall or engine rotor overspeed. In such an exemplary situation, a response time of about 100 milliseconds or less is desired in order to sense the fail-positive fault and to take remedial action such as shutting down the engine if the actuator itself fails, or automatically changing over to a redundant circuit to the actuator if the primary control circuit fails. Accordingly, the transient dynamic response of the fault detection system must be sufficiently fast, sensitive, and reliable for detecting a fault for allowing sufficient time for taking remedial action.

Since improved transient performance of the fault detection system is typically obtained by increasing the complexity of the mathematical model used therein, matching of the mathematical model to the system dynamics becomes more difficult. In such situations, the fault detection system must be carefully tailored to the dynamics of the actuator control system for obtaining accurate modeling. However, if any changes are made to the actuator control system during design or during testing, the fault detection system must be similarly adjusted to match the system dynamics of the control system, which is a time-consuming process.

OBJECTS OF THE INVENTION

Accordingly, one object of the present invention is to provide a new method and apparatus for detecting fault in an actuator closed loop feedback control system.

Another object of the present invention is to provide a fault detection system having improved response time.

Another object of the present invention is to provide a fault detection system having a model output which diverges from actuator position during a fault condition for obtaining improved response time.

Another object of the present invention is to provide a fault detection system having improved transient response.

Another object of the present invention is to provide a fault detection system which directly observes the dynamics of the feedback control system.

Another object of the present invention is to provide a fault detection system having a relatively simple mathematical model of the feedback control system.

Another object of the present invention is to provide a fault detection system having a mathematical model only of an actuator controlled by the feedback control system.

Another object of the present invention is to provide a fault detection system usable for different position actuators regardless of controller dynamics.

Another object of the present invention is to provide a fault detection system which does not require adjustment when feedback control system components are varied in dynamic characteristic during design or testing.

DISCLOSURE OF INVENTION

A method for fault detection in a closed loop feedback control system for an actuator includes modeling the actuator for providing a model output simulating the actuator output in response to a model input which is also the actuator input, and comparing the actuator output and the model output for providing a fault indication upon exceeding a threshold. The apparatus includes a feedback control system having means for providing a feedback signal indicative of an output of the actuator, means for comparing an output demand with the feedback signal for providing an actuator output error, and means for providing to the actuator an input proportional to the error. The apparatus also includes a fault detection system having means for modeling the actuator for providing a model output simulating the actuator output in response to a model input, means for providing the actuator input also to the actuator modeling means as the model input, and means for comparing the actuator output and the model output and providing a fault indication upon exceeding a threshold.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

MODE(S) FOR CARRYING OUT THE INVENTION

Figure 1:
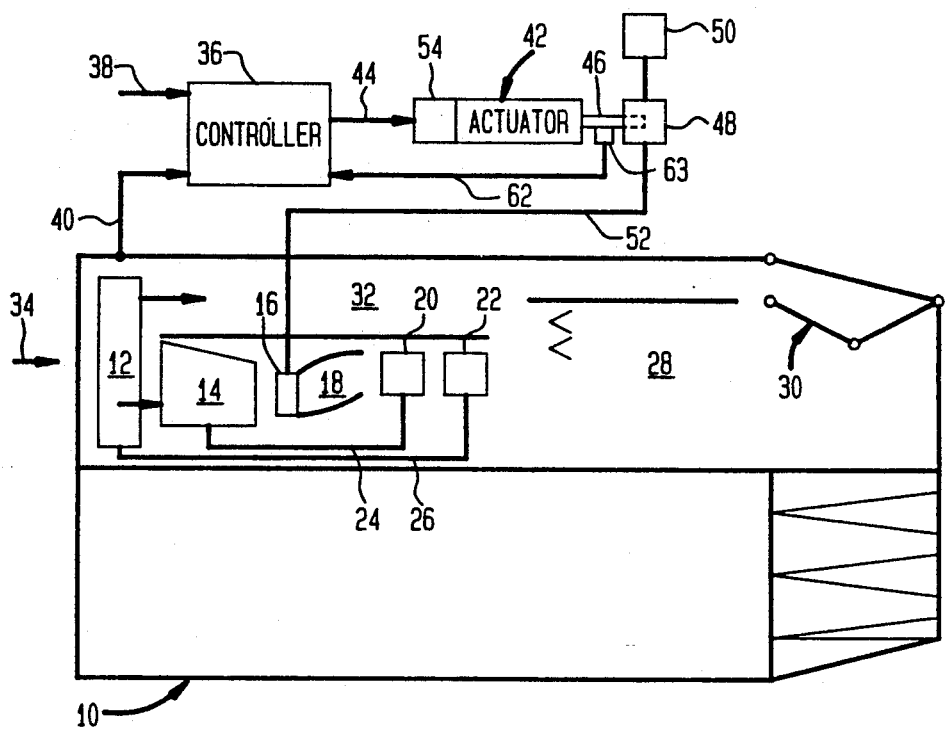
FIG. 1 is a schematic representation of an exemplary gas turbine engine including an engine control system having an actuator feedback control system and fault detection system in accordance with one embodiment of the present invention.

Illustrated in FIG. 1 is a schematic representation of an exemplary augmented, turbofan gas turbine engine 10. The engine 10 includes conventionally in serial flow communication a fan 12, a compressor 14, a fuel injection assembly 16, a combustor 18, a high-pressure turbine (HPT) 20, and a low-pressure turbine (LPT) 22. The HPT 20 is conventionally joined to the compressor 14 through a high-pressure rotor shaft 24, and the LPT 22 is conventionally joined to the fan 12 by a fan rotor shaft 26. The engine 10 further includes a conventional afterburner, or augmentor, 28 disposed downstream of the LPT 22, and a conventional variable area exhaust nozzle 30 disposed downstream of the augmentor 28. A conventional bypass duct 32 surrounds the compressor 14 and extends from the compressor 14 downstream to the LPT 22 for bypassing a portion of inlet air 34 from entering the compressor 14.

The engine 10 further includes an engine controller 36 which is responsive to a conventional signal, or signals, 38, such as a throttle position, and is also responsive to an engine condition signal, or signals, 40 for controlling operation of the engine 10. The engine controller 36 is conventional, except for the incorporation therein of the present invention as described herein, and is effective for controlling numerous actuators and functions of the engine 10.

The engine 10 includes a plurality of conventional actuators 42, only one of which is shown, for controlling the positions of various components in the engine 10 in response to a respective actuator input signal 44 from the controller 36. In the exemplary embodiment of the invention illustrated in FIG. 1, the actuator 42 comprises a linear actuator having an extendable and retractable output rod 46 conventionally secured to a fuel metering valve 48 for controlling the operation thereof. A conventional fuel supply 50 is disposed in flow communication with the valve 48 for providing fuel thereto. The valve 48 is conventionally joined in fluid communication to the fuel injection assembly 16 by conventional fuel conduits 52.

The actuator 42 is a conventional servomechanism having an electrical interface 54 which controls the position of the output rod 46 in direct response to the input signal 44 provided to the interface 54 from the engine controller 36. In response to the throttle signal 38, for example, the engine controller 36 provides the input signal 44 to the actuator 42 for controlling the fuel metering valve 48 and thereby controlling the amount of fuel provided from the fuel injection assembly 16 into the combustor 18 for powering the engine 10.

For example, the controller 36 can cause the fuel metering valve 48 to introduce fuel into the combustor 18 for causing the fan rotor 26 to rotate at about 95% speed, which is a conventional corrected rotor speed. In the event of a failure of the actuator 42 during operation of the engine 10, it is desirable to detect that failure, or fault, for taking remedial action. The remedial action could be the shutting down of the engine 10 by conventional means, not shown, in response to the controller 36. In the event the failure is due not to the actuator 42 itself, but a portion of the controller 36 separate from the actuator 42, the controller 36 can take remedial action by switching to a redundant circuit having a redundant input signal 44 to a redundant portion of the electrical interface 54 and using a redundant actuator output position sensor as is conventionally known. However, in a situation where the fan rotor 26 is operating at relatively high speed such as 95% rated speed, the fault must be detected and the remedial action effected in a relatively quick time, for example, about 100 milliseconds, or less, to prevent compressor stall, or rotor overspeed, for example.

Figure 2:
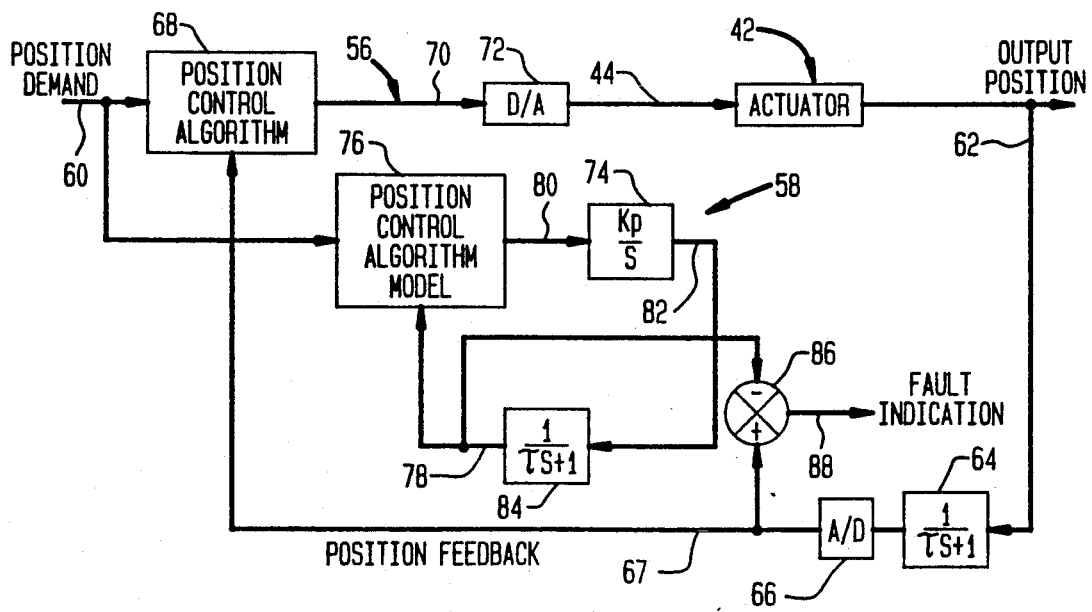
FIG. 2 is a block diagram of a prior art actuator control system and fault detection system in a digital electronic control system.

Illustrated in FIG. 2 is a block diagram representation of a conventional actuator closed loop feedback control system 56 and a conventional fault detection system 58 implemented in a digital electronic control. Both of the systems 56 and 58 would be conventionally embodied in a portion of the engine controller 36 illustrated in FIG. 1. The engine controller 36 conventionally provides a position demand signal 60 which represents the desired value of the output position of the output rod 46 of the actuator 42 represented by the output position signal 62. The output position signal 62, or output feedback signal 62, is conventionally obtained by a conventional actuator position sensor, or means 63 (shown in FIG. 1), operatively connected to the output rod 46. The actuator position sensor 63 may include, for example, a resolver, a transformer, a proximity sensor, or other conventional position sensors.

In this exemplary embodiment of the prior art control system 56, a conventional filter 64, represented by its Laplace transform $1/(\tau s+1)$, is used for filtering the feedback signal 62 and a conventional analog-to-digital (A/D) converter 66 samples the filtered feedback signal 62 to provide a sampled position feedback signal 67 to a conventional position control algorithm 68. The position control algorithm 68 is conventionally provided in the digital controller 36 and compares the position demand signal 60 with the sampled feedback position signal 67 for generating a difference error signal to which is applied a predetermined gain for generating an amplified signal 70 which is conventionally provided to a conventional digital-to-analog (D/A) converter 72. The D/A converter 72 then provides the actuator input signal 44 to the actuator 42.

The prior art fault detection system 58 illustrated in FIG. 2 includes a mathematical model 74 of the actuator 42 itself which is represented by its Laplace transform $K_p/s$, for example. The fault detection system 58 further includes a position control algorithm 76, which is similar to the algorithm 68, for providing a comparison of the position demand signal 60, which is provided to it also, and a filtered model feedback signal 78 and conventionally applying dynamics, logic, and a predetermined gain to the difference thereof for providing a model input signal 80 to the model 74. A model output signal 82 is conventionally provided to a conventional filter 84, which is represented by its Laplace transform $1/(\tau s+1)$, for example, to generate the filtered model feedback signal 78. The filtered model output signal 78 is also provided to a conventional model comparator 86, which takes the difference between the filtered output signal 78 and the sampled actuator output position signal 67 to determine whether or not a fault exists. If the fault detection system 58 accurately models and predicts the output position 62 in the feedback control system 56, then the difference between the filtered model output signal 78 and the sampled actuator output position signal 67 should be zero when no fault exists. When a fault condition exists, however, a difference between the sampled actuator output position signal 67 and the filtered model output signal 78 will exist, thus indicating a fault, represented by fault indication signal 88.

As above described, however, since the input to the fault detection system 58 is the position demand signal 60, then the fault detection system 58 must be designed to accurately model the feedback control system 56 for minimizing differences in dynamic performance therebetween.

Figure 3:
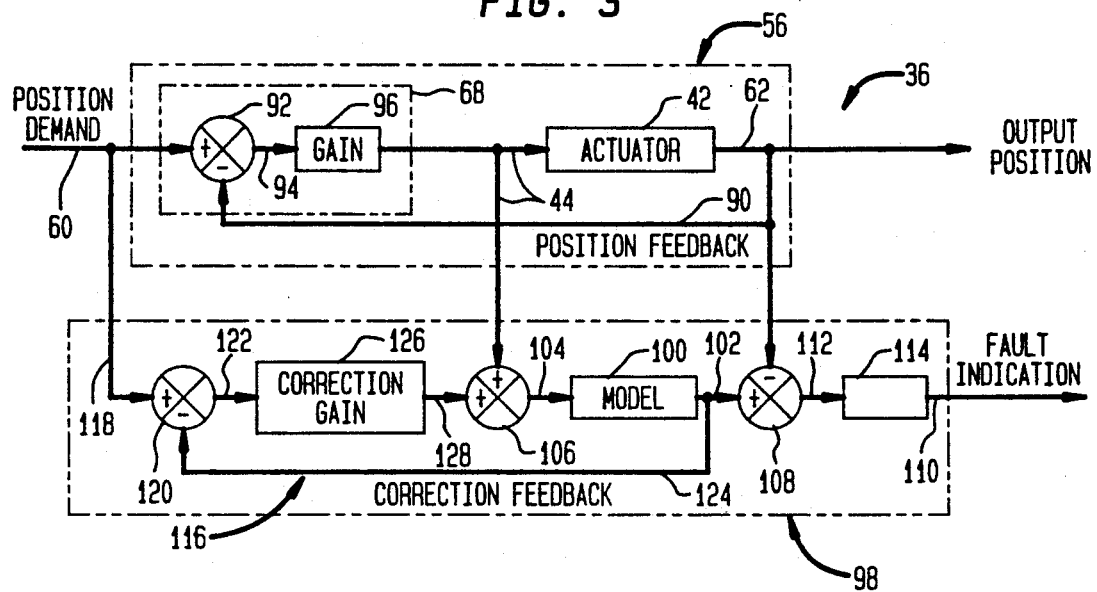
FIG. 3 is a block diagram of an actuator feedback control system and a fault detection system in accordance with one embodiment of the present invention.

Illustrated in FIG. 3 is a portion of the controller 36 having fault detection for the actuator 42 in accordance with one embodiment of the present invention. The controller 36 includes the conventional actuator feedback control system 56 represented generally within the rectangular dashed box labelled 56. The feedback control system 56 includes conventional means 90 for providing a feedback signal indicative of the output of the actuator 42, as represented by the output position signal 62. The feedback means 90 is schematically represented by the position feedback loop, or signal, also designated 90, and is conventional. The feedback control system 56 further includes conventional means 92 for comparing an output demand signal, for example the position demand signal 60, with the feedback signal 90 for providing an actuator output error signal 94. The comparing means 92, or comparator 92, simply takes the difference between the position demand signal 60 and the feedback signal 90 by subtracting the feedback signal 90 from the position demand signal 60. The feedback control system 56 further includes amplifier means 96 for providing to the actuator 42 the input signal 44 proportional to the error signal 94 which may be accomplished by applying a conventional gain to the error signal 94. It is to be noted that the block diagram representation illustrated in FIG. 3 is generic and may be implemented in analog, dedicated digital, or computer (software) embodiments of the invention in a conventional manner. In a digital implementation of the invention, for example, the comparator 92 and the amplifier 96 may be implemented in software algorithms and are analagous to the position control algorithm 68 illustrated in FIG. 2, and represented in the dashed box 68 in FIG. 3. Of course, the algorithms are conventionally determined for each particular design application and may have varying degrees of complexity and sophistication for generating the input signal 44 for controlling the actuator 42.

In accordance with one embodiment of the present invention, a fault detection system 98, or alternatively referred to as a Looparound system 98, is illustrated in FIG. 3, generally within the dashed line rectangular box labelled 98. The fault detection 98 includes conventional means 100 for mathematically modeling or simulating the actuator 42 for providing a model output signal 102 simulating the actuator output signal 62 in response to a model input signal 104. Means 106 are also provided for providing the actuator input signal 44 also to the model 100 as the model input signal 104. The means 106 may simply be a conventional circuit path for channeling the actuator input signal 44 also to the model 100 as the model input signal 104 and, in the preferred embodiment illustrated, is in the form of a conventional summing junction, also designated 106, suitably connected to the amplifier 96 or actuator 42 for receiving the input signal 44.

The fault detection system 98 further includes means 108 for comparing the actuator output signal 62 and the model output signal 102 and providing a fault indication 110 upon exceeding a predetermined threshold. The comparing means 108, or simply comparator 108, in an exemplary embodiment subtracts the actuator output position signal 62 from the model output signal 102 for generating a fault error signal 112. The fault error signal 112 is conventionally provided to a conventional threshold means 114 which provides the fault indication signal 110 for fault error signals 112 larger than a predetermined threshold value. For fault error signals 112 less than the predetermined value, the fault indication 110 will be zero, indicating a no-fault condition. Alternatively, the comparator 108 and threshold means 114 could be any other means for evaluating the two signals for indicating fault. For example, instead of using a difference between the two signals, rates of change of the signals could be evaluated.

The fault detection system 98 as described above provides improved performance since the model input signal 104 is the same signal as the actuator input signal 44 thereby capturing the dynamic performance of the feedback control system 56. This arrangement results in a better matching of the dynamics of the feedback control system 56 to the fault detection system 98, and thereby allows for the use of a simpler model 100.

More specifically, the actuator may be in the form of an integrator, since the actuator output is simply the position of the actuator output rod 46. The model 100, therefore, can be represented by the Laplace transform for an integrator which is simply $K_p/s$, where $K_p$ represents a predetermined gain and s is the conventional Laplace transform complex variable. In actual practice of the invention, an average error between the performance of the model 100 and the actuator 42 will exist which will lead to wind-up of the integrator model 100 and to an undesired continuous fault indication. Accordingly, means 116 for correcting the actuator model 100 are provided for reducing differences between the actuator output signal 62 and the model output signal 102 during no-fault operation of the control system.

In its simplest form, the correction means 116 includes a reference 118 obtained from the feedback control system 56. The reference 118 may be a suitable position feedback reference such as the position feedback signal 62. In the preferred embodiment, the reference 118 is the output demand signal, or position demand signal 60. Also in the preferred embodiment, the correcting means 116 includes means 120 for comparing the model output signal 102 and the position demand signal 60 for providing a model output error signal 122. The model output signal 122 is conventionally provided to the comparator 120 by conventional model correction feedback means or path 124 which is illustrated in FIG. 3 schematically as the correction feedback signal 124, which is the same signal as the model output signal 102. The correcting means 116 also includes means 126, such as a conventional amplifier, for applying a correction gain to the model output error signal 122 for providing a correction signal 128 to the summing means 106.

Accordingly, the correcting means 116 provides a closed loop feedback path for the model 100 and uses the position demand signal 60 as the reference 118. In one of its simplest forms, the model 100 models solely the actuator 42 in the form of an integrator, and the correction gain provided by the amplifier 126 is predeterminedly sized for preventing the model integrator 100 from winding up and causing the fault indication 110 during no-fault operation of the controller 36. The value of the correction gain provided by the amplifier 126 is relatively small and is determined for particular applications. It is predeterminedly selected to match the expected difference between the model output signal 102 and the actuator output signal 62, and so that predeterminedly small differences therebetween do not lead to the fault indication 110.

The value of the correction gain provided by the amplifier 126 also affects the response time of the fault detection system 98 relative to that of the feedback control system 56. The value of the correction gain provided by the amplifier 126 is preselected so that the fault detection system 98 has a first bandwidth which is smaller than a second bandwidth of the feedback control system 56. In the preferred embodiment, the first bandwidth is about an order of magnitude (i.e. 10) smaller than the second bandwidth. This provides for a transient response time of the fault detection system 98 for providing the fault indication 110 in less than about 100 milliseconds in response to a fault condition. Accordingly, the low bandwidth of the fault detection system 98 compared to the higher bandwidth of the feedback control system 56 provides a slower frequency response of the fault detection system 98 as compared to the feedback control system 56 to ensure the detection of fault in a relatively short time and without undesirable integrator error from the model 100.

The controller 36 in accordance with the present invention, as illustrated schematically in FIG. 3, may be implemented in any conventional embodiments including analog, dedicated digital, and computer software. Illustrated in FIG. 4, for example, is the implementation of the controller 36 in a digital electronic control analagous to the digital electronic control implementation of the prior art control system illustrated in FIG. 2. Since the FIG. 4 embodiment of the invention is directly analagous to the FIG. 3 embodiment, with like reference numerals indicating like elements, only a brief summary of FIG. 4 will be presented.

Figure 4:
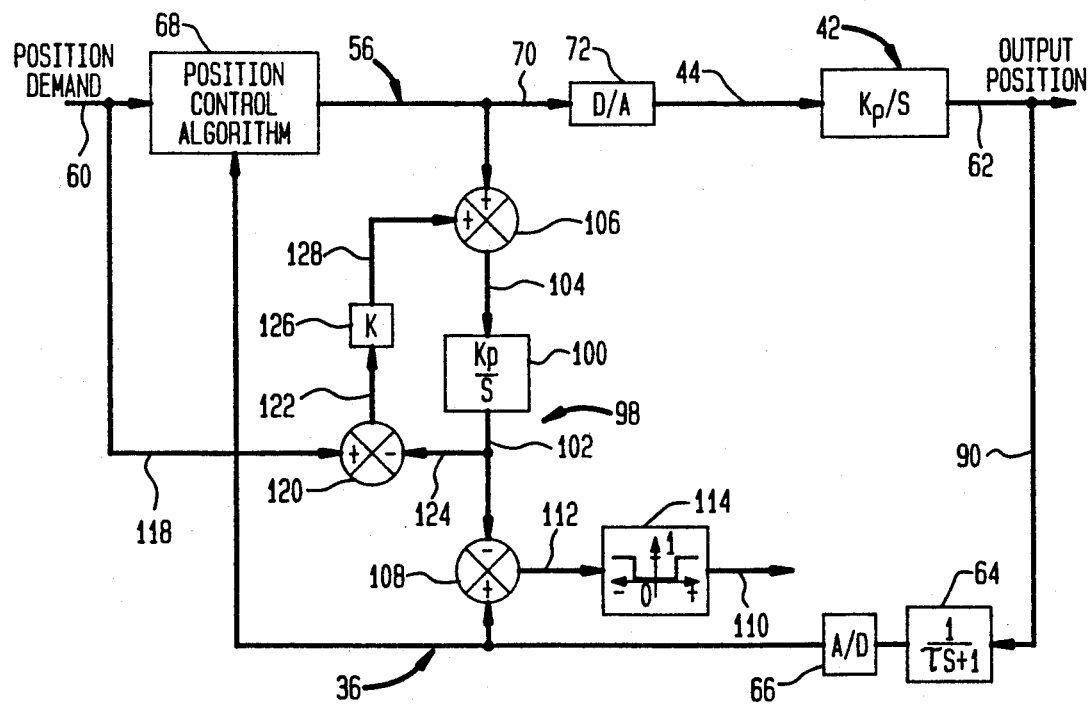
FIG. 4 is a block diagram of the feedback control system and fault detection system illustrated in FIG. 3 implemented in an exemplary digital electronic control system.

The portion of the controller 36 illustrated in FIG. 4 is configured as a digital electronic control including the feedback control system 56 and the fault detection system 98. The comparator 92 and the amplifier 96 illustrated in FIG. 3 are provided in the position control algorithm 68 illustrated in FIG. 4. The D/A converter 72 is the means for providing the actuator input signal 44 to the actuator 42 which is represented by its Laplace transform $K_p/s$. The summing means 106 receives the signal 70 which is the same as the actuator input signal 44 and is unaffected by the D/A converter 72. The feedback signal providing means, represented by the feedback signal 90 includes the conventional filter 64 and the conventional A/D converter 66.

In the embodiment of the invention illustrated in FIG. 4, it is noted that the prior art position control algorithm model 76 illustrated in FIG. 2 is not utilized or required since the Looparound system 98 directly observes dynamic response of the feedback control system 56 through the signal 70.

The D/A converter 72, the A/D converter 66, and the filter 64 are disclosed in the digital electronic control embodiment of the invention illustrated in FIG. 4 to illustrate additional factors in the controller 36 which create differences between the model output signal 102 and the actuator output position signal 62 since such elements are not modeled in the simple integrator model 100. However, the effects of the D/A converter 72, A/D converter 66, and the filter 64 are accommodated effectively by the correction gain K of the amplifier 126 which has a predetermined value for reducing the differences between the actuator output signal 62 and the model output signal 102 during no-fault operation of the control system. Accordingly, the effects of these elements, as well as others, can be simply accommodated in the fault detection system 98 by predeterminedly selecting the correction gain K of amplifier 126 instead of providing a more complex model 100. In this regard, it is noted that the filter 84 associated with the model 74 in FIG. 2 is not utilized in the FIG. 3 model 100, since it also is accommodated by the correction gain K.

FIG. 4 also illustrates schematically the threshold 114 which is effective for providing a unit output, indicating fault, for predetermined positive and negative values of the fault error signal 112, and for providing a zero output for values of the fault error signal 112 between those preselected positive and negative values.

Figure 5:
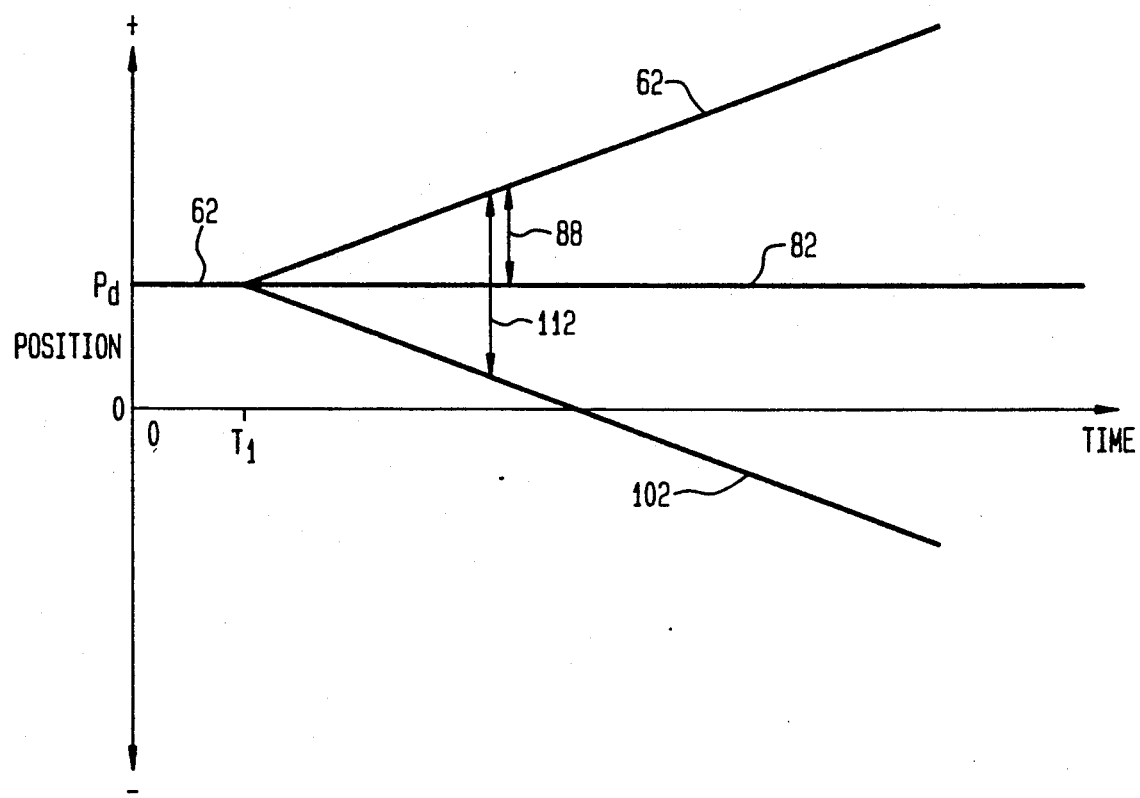
FIG. 5 is a graph plotting actuator position versus time for a feedback control system and fault detection system performance in the event of a failed-positive actuator condition.

Illustrated in FIG. 5 is a graph plotting the position of the output rod 46 of the actuator 42 versus time for a failed-positive fault occuring in the controller 36. For example, the output rod 46 may fail in a situation wherein fuel is continually increased in value linearly to the fuel injection assembly 16. In this situation, the controller 36 provides a position demand value Pd, which is a predetermined positive value as illustrated in FIG. 5, and up to time T1 the position of the output rod 46 and the output signal 62 remain constant. At time T1 a failed-positive fault occurs which allows the output rod 46 to continue to extend at a linearly increasing rate as indicated by the position output signal 62. Since the position demand signal 60 remains at the preselected value Pd, the model output signal 82 of the prior art fault detection system 8 illustrated in FIG. 2 continues to predict a constant value of the actuator output as indicated by the straight line 82 parallel to the time axis. However, the difference between the actuator output position signal 62 and the model output signal 82 increases as represented by the line labelled 88 in FIG. 5 representing the fault indication signal 88 illustrated in FIG. 2.

In accordance with the embodiment of the invention illustrated in FIG. 3, the model output signal 102 diverges away from the actual actuator output position signal 62 at an opposite slope as illustrated in FIG. 5. The fault error signal 112 of the fault detection system 98 thus increases, and has a larger value, faster than the increase in the fault indication signal 88 of the conventional fault detection system 58 illustratred in FIG. 2. This provides for an increased response time of the fault detection system 98 thus increasing the effective amount of time for taking remedial action by providing an earlier indication of fault upon exceeding the threshold.

The above-described apparatus is one means for implementing an improved method in accordance with the present invention. The method is applicable for fault detection in a closed loop feedback control system 56 for the actuator 42. The method comprises the steps of modeling the actuator 42 for providing the model output signal 102 simulating the actuator output signal 62 in response to the model input signal 104. The method also includes providing the actuator input signal 44 also to the actuator modeling means 100 as the model input signal 104, and comparing the actuator output signal 62 and the model output signal 102 (in the comparator 108) for providing the fault indication 110 upon exceeding a threshold in the threshold means 114.

The method further includes correcting the actuator modeling means 100 for reducing differences between the actuator output signal 62 and the model output signal 102 during no-fault operation of the feedback control system 56.

The correction step includes comparing the model output signal 102 and the output demand signal 60 (reference 118) in the comparator 120 for providing a model output error signal 122. The method further includes applying a correction gain (in amplifier 126) to the model output error signal 122 for providing a correction signal 128. The method also includes adding the correction signal 128 to the model input signal 44 in the summing means 106.

Accordingly, the present invention is effective for providing the fault detection system 98 which has faster response time than the conventional fault detection system 58. This is due primarily to utilizing in the model 100 the same input as provided to the actuator 42 from the amplifier 96, thus capturing the dynamic response of the feedback control system 56. During fault, the model output signal 102 diverges away from with an opposite slope to the actuator output position signal 62 thus providing for increased transient response of the fault detection system 98. The fault detection system 98 in accordance with the present invention can utilize relatively simple models 100, for example, a simple integrator model represented by the Laplace transform Kp/s while still enjoying closely matched dynamic performance between the feedback control system 56 and the fault detection system 98. The fault detection system 98 is usable for any position actuator 42 regardless of control dynamics. More complex actuators 42 may be modeled with more complex respective Laplace transforms in the mathematical model 100. In the digital electronic control implementation of the invention as illustrated in FIG. 4, for example, adjustments to the actuator control system 56 during design and testing of the feedback control system 56 may be made without requiring corresponding changes in the fault detection system 98.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

More specifically, and for example only, although the fault detection system 98 has been described in conjunction with a control system designed for controlling position output of the actuator 42, it is contemplated that the fault detection system may also be used for other types of closed loop actuator control systems. Although relatively simple mathematical models 100 are preferred, more complex mathematical models may also be used in other embodiments of the present invention. And, other types of conventional actuators may also be used having various types of outputs instead of output rods.

Accordingly, what is desired to be secured by Letters Patent of the United States is the invention as defined and differentiated in the following claims:

We claim:

1. A control system having fault detection for an actuator comprising:
an actuator feedback control system for said actuator including:
means for providing a feedback signal indicative of an output of said actuator;
means for comparing an output demand signal with said feed back signal for providing an actuator output error signal; and
means for providing to said actuator an input signal proportional to said error signal; and
a fault detection system including:
means for modeling said actuator for providing a model output signal simulating said actuator output signal in response to a model input signal;
means for providing said actuator input signal also to said actuator modeling means of said model input signal;
means for comparing said actuator output signal and said model output signal and providing a fault indication upon exceeding a threshold;
means for comparing said model output signal and said output demand signal and providing a model output error signal during no-fault operation of said feedback control system;

2. An actuator control system according to claim 1 wherein said output demand signal is a position demand signal.

3. An actuator control system according to claim 1 wherein said fault detection system has a first bandwidth, said actuator feedback control system has a second bandwidth, and said first bandwidth is smaller than said second bandwidth.

4. An actuator control system according to claim 3 wherein said first bandwidth is about an order of magnitude smaller than said second bandwidth.

5. An actuator control system according to claim 1 wherein said actuator is an integrator.

6. An actuator control system according to claim 5 wherein said actuator modeling means models solely said actuator, and said correction gain is sized for preventing said model integrator from winding up and causing said fault indication during said no-fault operation of said actuator feedback control system.

7. An actuator control system according to claim 5 wherein said actuator is a fuel metering valve actuator for a gas turbine engine.

8. An actuator control system according to claim 5 sized and configured for having a transient response time for providing said fault indication in less than about 100 milliseconds in response to a fault condition.

9. an actuator control system according to claim 5 configured as a digital electronic control wherein said actuator feedback control system comparing means and said actuator input signal providing means comprise a position control algorithm and a D/A converter, and said feedback signal providing means includes a filter and an A/D converter.

10. An actuator control system according to claim 9 wherein said correction gain has a predetermined value for reducing differences between said actuator output and said model input signal during said no-fault operation of said actuator feedback control system due additionally to said D/A converter, said filter, and said A/D converter.

11. A method for fault detection in a closed loop, feedback control system for an actuator having means for providing a feedback signal indicative of an output of said actuator, means for comparing an output demand signal with said feedback signal for providing an actuator output error signal, and means for providing to said actuator an input signal proportional to said error signal comprising the steps of:

modeling said actuator for providing a model output signal simulating said actuator output in response to a model input signal;

providing said actuator input signal also as said model input signal;

comparing said actuator output signal and said model output signal and providing a fault indication in less than about 100 milliseconds after exceeding a threshold;

comparing said model output signal and said output demand signal for providing a model output error signal during no-fault operation of said feedback control system;

applying a correction gain to said model output error signal for providing a correction signal; and adding said correction signal to said model input signal.

* * * * *